Aug. 2, 1927.
R. CONRADER
1,637,736
GATE VALVE
Original Filed June 17, 1925   2 Sheets-Sheet 1
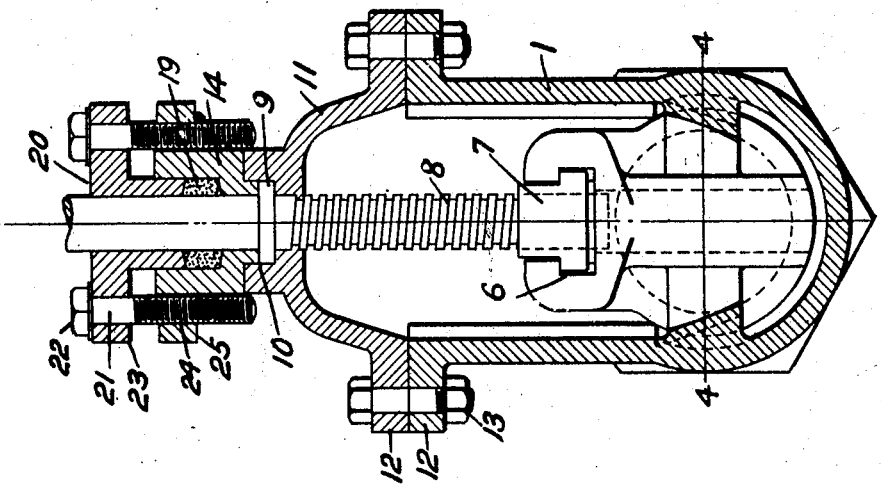
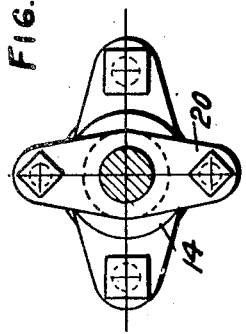
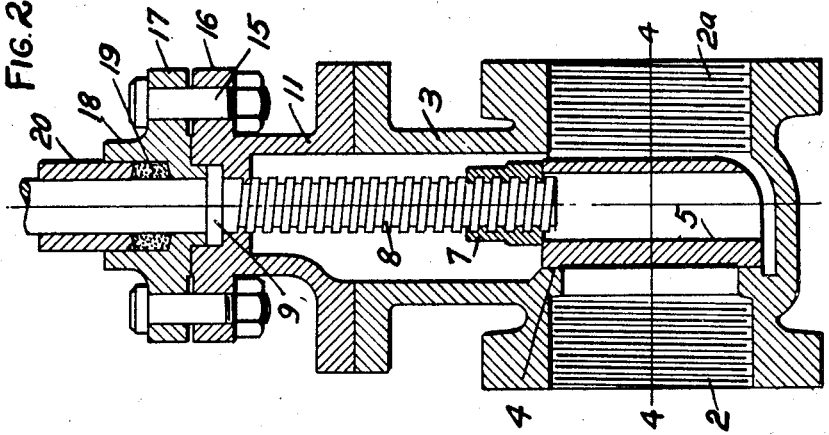
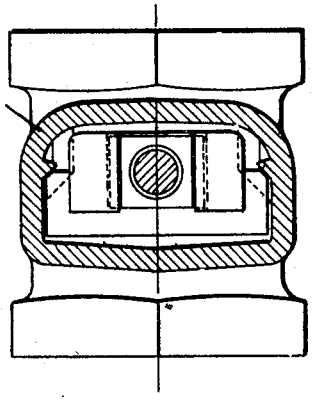
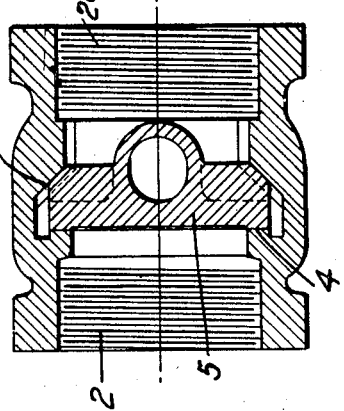
Inventor
Rudolph Conrader
By W. L.
Attorney Aug. 2, 1927.

R. CONRADER

GATE VALVE

Original Filed June 17, 1925    2 Sheets-Sheet 2

1,637,736

Inventor
Rudolph Conrader
By
Attorney

Patented Aug. 2, 1927.

1,637,736

UNITED STATES PATENT OFFICE.

RUDOLPH CONRADER, OF ERIE, PENNSYLVANIA.

GATE VALVE.

Application filed June 17, 1925, Serial No. 37,784. Renewed October 23, 1926.

Great difficulty has been experienced in assuring a tight joint in a gate valve. This has been very largely due to the fact that the pressure seating the valve head has not been uniformly applied, or the pressure has not been well distributed. The present invention assures a uniform seating of the valve and also provides means, in its preferred form, by which the valve may be readily ground to its seat. The invention also contemplates an improved means of securing the stem to the valve and of mounting the stem in the body. Other features and details of the invention will more fully appear from the specification and claims.

The invention is illustrated in the accompanying drawings as follows:—

Fig. 1 shows a central vertical section through the valve, said section being parallel to the seat.

Fig. 2 a similar section at right angles to the seat.

Fig. 3 a plan view of the valve with the head removed.

Fig. 4 a section on the line 4—4 in Figs. 1 and 2.

Fig. 5 a plan view of the valve.

Figure 6:
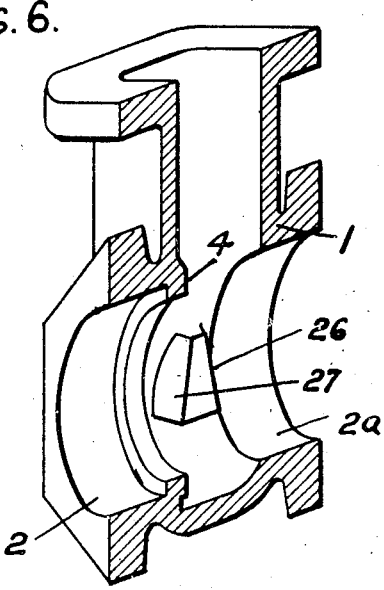

Fig. 6 a perspective section of the body, the section being on the same plane as Fig. 2.

Figure 7:
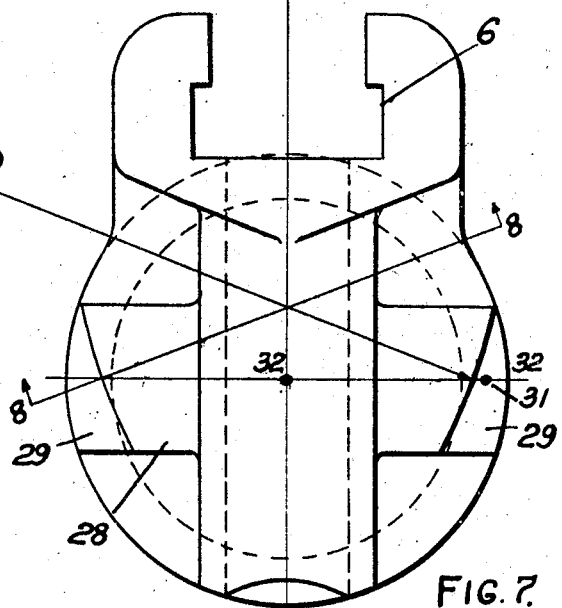

Fig. 7 an enlarged view of the rear of the valve head.

Figure 8:
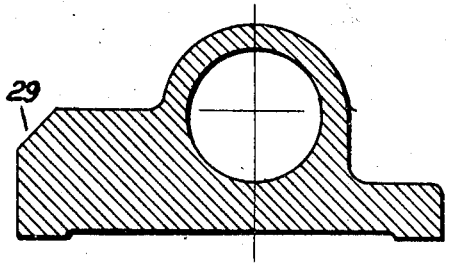

Fig. 8 a section on the line 8—8 in Fig. 7.

Figure 9:
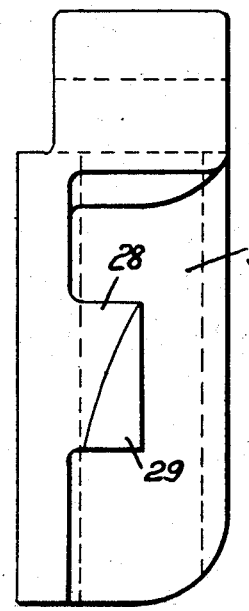

Fig. 9 a side elevation of the head enlarged.

Figure 10:
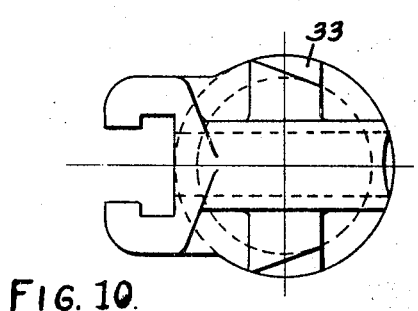

Fig. 10 a rear view of an alternative construction of head.

Figure 11:
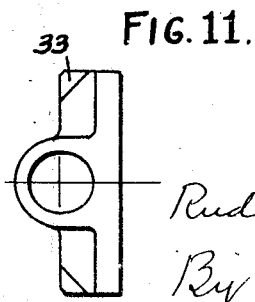

Fig. 11 a bottom view of the same.

1 marks the body of the valve. This has a passage therethrough with an inlet 2 and discharge 2ª with a bonnet extension 3 and valve seat 4.

The valve head 5 is adapted to operate against the seat 4. It has the undercut slot 6 in which is arranged a nut 7, the nut being provided with a head locking it axially in the slot 6 and also locking it against turning in said slot. A stem 8 is screw-threaded and operates in a nut 7. The stem is provided with a shoulder 9 which is seated in a socket 10 in a bonnet 11. The bonnet and body have flanges 12—12 and are secured together by bolts 13.

A cap 14 is secured by bolts 15 to the bonnet, the bonnet having ears 16 and the cap the ears 17 through which the bolts extend. The cap locks the shoulder 9 and consequently the stem against axial movement relatively to the bonnet. The cap also has a stuffing box 18 carrying a packing 19. A follower 20 operates in the stuffing box. Cap screws 21 having heads 22 extend through perforations in ears 23 on the follower and are screwed into screw-threaded openings 24 in ears 25 extending from the cap 14, the ears 25 being at right angles to the ears 16.

By providing separate bolts for securing the cap 14 and staggering or off-setting the ears between the cap and the follower it is possible to use cap screws for the follower and consequently the heads of the screws move with the top of the follower, the space between the ears 16 permitting of the running space for the bottom end of the screw. This is desirable in that where studs are used, as has been the practice in the past, these studs project through the follower and present an end which often causes injury to the operator.

The body is provided with the wedge lugs or projections 26 which are provided with inclined or wedging surfaces 27. These wedging surfaces are preferably plane surfaces and are not only inclined toward the seat 4 but are also inclined relatively to the axis of the seat or head. In addition to this they may be and preferably are inclined toward each other.

The head has a cross bar extending horizontally across it at the rear and the ends of this bar are provided with inclined surfaces 29, the general inclination of these surfaces following the inclination of the surface 27. The crossbar is rigid with relation to the valve head and the surfaces are preferably within the periphery of the head.

This arrangement of inclined surfaces, particularly the inclination of the surface toward the axis of the valve is of very great importance. Heretofore the common practice, where the inclined surfaces operate directly upon a fixed portion of the valve head, has been to incline the surfaces toward the valve seat only and as a result unless the surfaces were very nicely constructed greater pressure has been delivered to one side of the valve than to the other with a consequent looseness at the one side. Further unless the valve heads have been nicely guided they have, with each seating, found a different seat so that even though seating perfectly at one place they do not always seat perfectly at some other place, made possible by the shifting of the valve. By inclining these engaging surfaces toward the axis of the seat, the valve head is not only moved toward its seat but is moved crosswise due to the inclination of the engaging surfaces to the axis until the wedging pressure on both sides is equalized and at the same time the valve head is brought to exactly the same position on the seat with each operation.

I prefer to form the surface 29 with a slight curve so that the valve head may be oscillated preferably by using the stem as a handle when it is desired to regrind the valve seating surfaces. The preferable curve is that of a cone having an axis, as 30, and the axis is located relatively to the engaging surface 27 as to make that engaging surface tangent to the cone and to have a point 31 in the line of contact between the cone and the surface 27 in a horizontal radially extending line 32—32 so that pressure is delivered to the valve midway between the top and the bottom. In regrinding the valve, the curved surface permits of a free oscillation with a slight vertical movement in the oscillation so that all parts of the valve face are moved relatively to the seat. The wedging surfaces are utilized in applying pressure to the grinding surfaces by a slight downward pressure on the stem as it is oscillated.

I prefer to give the nut some clearance in the slot 6 and also make the opening 8ª into which the screw or stem 8 extends below the nut slightly larger than the stem so that the valve head may have freedom of movement without deflecting the stem to accommodate itself to the wedge surfaces and the seat.

In the alternative construction shown in Figs. 10 and 11 an inclined surface 33 corresponding to the surface 29 is formed as a plane surface. This surface will operate more satisfactorily than the wedge surfaces which are in the same plane at both sides of the disc, in other words, the bevel tends to correct errors. However, unless these surfaces contact at both ends equally there will be an unequal pressure on different parts of the face of the valve. This result is obviated in the preferred construction by the slight curve given to the wedging surface 29 so that the contact, or engagement is approximately diametrically opposite the center of the disc and further the slight curve permits the disc to rock slightly so as to seat perfectly and with an approximately equal pressure on all parts of the circumference.

While I have shown the axis of the cone for the surface 29 as 30, it will be understood that it may be varied to suit the metal of which the valve is made. Where a very soft metal is used it is desirable to make the radial line longer so that the contacting surface may more nearly approximate a plane and consequently within the elastic limit of the metal give a greater contact surface. Where the metal is harder the cone may be formed with a shorter radius, in fact, the point 30 for the axes of the curves 29 for each side may be coincident if desired.

What I claim as new is:—

1. In a valve, the combination of a body; a seat in said body; a gate valve head operating on said seat; and wedging mechanism having engaging surfaces rigid with the body and head forcing the head into seating engagement with the seat as the head is moved across the axis of the seat in closing, said wedging surfaces permitting, when engaged, universal inclinational freedom of the head relatively to the seat.

2. In a valve, the combination of a body; a seat in said body; a gate valve head operating on said seat; and wedging mechanism having engaging surfaces rigid with the body and head forcing the head into seating engagement with the seat as the head is moved across the axis of the seat in closing, said wedging surfaces permitting, when engaged, oscillating freedom of the head on the axis of the head corresponding to the axis of the seat.

3. In a valve, the combination of a body; a seat in said body; a gate valve head operating on said seat; and wedging mechanism having engaging surfaces rigid with the body and head forcing the head into seating engagement with the seat as the head is moved across the axis of the seat in closing, said wedging surfaces permitting, when engaged, universal inclinational freedom of the head relatively to the seat and oscillating freedom of the head on the axis of the head.

4. In a gate valve, the combination of a valve having a valve seat and wedging surfaces spaced from the valve seat, said surfaces being inclined toward the face of the seat and to the axis of the seat; a valve head having curved inclined surfaces, the axes of the curves being approximately parallel with the axis of the head; and means actuating the head.

5. In a gate valve, the combination of a valve having a valve seat and wedging surfaces spaced from the valve seat, said surfaces being inclined toward the face of the seat and to the axis of the seat; a valve head having curved inclined surfaces, the axes of the curves being off-set from and approximately parallel with the axis of the head; and means actuating the head.

6. In a gate valve, the combination of a valve having a valve seat and wedging surfaces spaced from the valve seat, said surfaces being inclined toward the face of the seat and to the axis of the seat; a valve head having inclined curved surfaces rigid with the head engaging the inclined surfaces of the body permitting universal inclinational freedom of the head relatively to the seat; and means actuating the head.

7. In a gate valve, the combination of a valve having a valve seat and wedging surfaces spaced from the valve seat, said surfaces being inclined toward the face of the seat and to the axis of the seat; a valve head having inclined curved surfaces rigid with the head engaging the inclined surfaces of the body, the axes of the curved surfaces of the head being approximately parallel to the axis of the head; and means actuating the head.

8. In a gate valve, the combination of a body having a valve seat and wedging surfaces spaced from the valve seat, said surfaces being inclined toward the face of the seat and to the axis of the seat; a valve head having curved inclined surfaces having axes off-set from the axis of the head and adapted to contact with the inclined surfaces of the body, the planes of the inclined surfaces of the body being tangential to the curved surfaces at the points of contact; and means actuating the head.

9. In a gate valve, the combination of a body having a valve seat and wedging surfaces spaced from the valve seat, said surfaces being inclined toward the face of the seat and to the axis of the seat; a valve head having curved inclined surfaces having axes off-set from the axis of the head and adapted to contact with the inclined surfaces of the body, the planes of the inclined surfaces of the body being tangential to the curved surfaces at the points of contact, with the points of contact between the inclined surfaces of the head and the inclined surfaces of the body at diametrically opposite sides of the center of the head; and means actuating the head.

10. In a gate valve, the combination of a body having a valve seat and wedging surfaces spaced from the valve seat, said surfaces being inclined toward the face of the seat and to the axis of the seat; a valve head having curved inclined surfaces having axes off-set from the axis of the head, with the planes of the inclined surfaces of the body tangential to the curved surfaces of the head at the points of contact and the points of contact being at diametrically opposite sides of the axis of the head; and means for actuating the head, 11. In a gate valve, the combination of a valve having a valve seat and wedging surfaces spaced from the valve seat, said surfaces being inclined toward the face of the seat and to the axis of the seat; a valve head having curved inclined surfaces, the axes of the curves being approximately parallel with the axis of the head; and a stem actuating the valve and adapted to oscillate the same.

12. In a gate valve, the combinaton of a body; a seat in the body; a gate valve head operating on said seat; and wedging mechanism having engaging surfaces on the head and body forcing the head into seating engagement with the seat as the head is moved across the axis of the seat in closing, said wedging surfaces when engaged permitting oscillating freedom of the head in the plane of the seating surfaces.

13. In a gate valve, the combination of a body; a seat in the body; a gate valve head operating on said seat; and wedging mechanism having engaging surfaces on the head and body centering the head, forcing the head into seating engagement with the seat as the head is moved across the axis of the seat in closing, said wedging surfaces when engaged permitting oscillating freedom of the head in the plane of the seating surfaces.

In testimony whereof I have hereunto set my hand.

RUDOLPH CONRADER.